Figure 1:
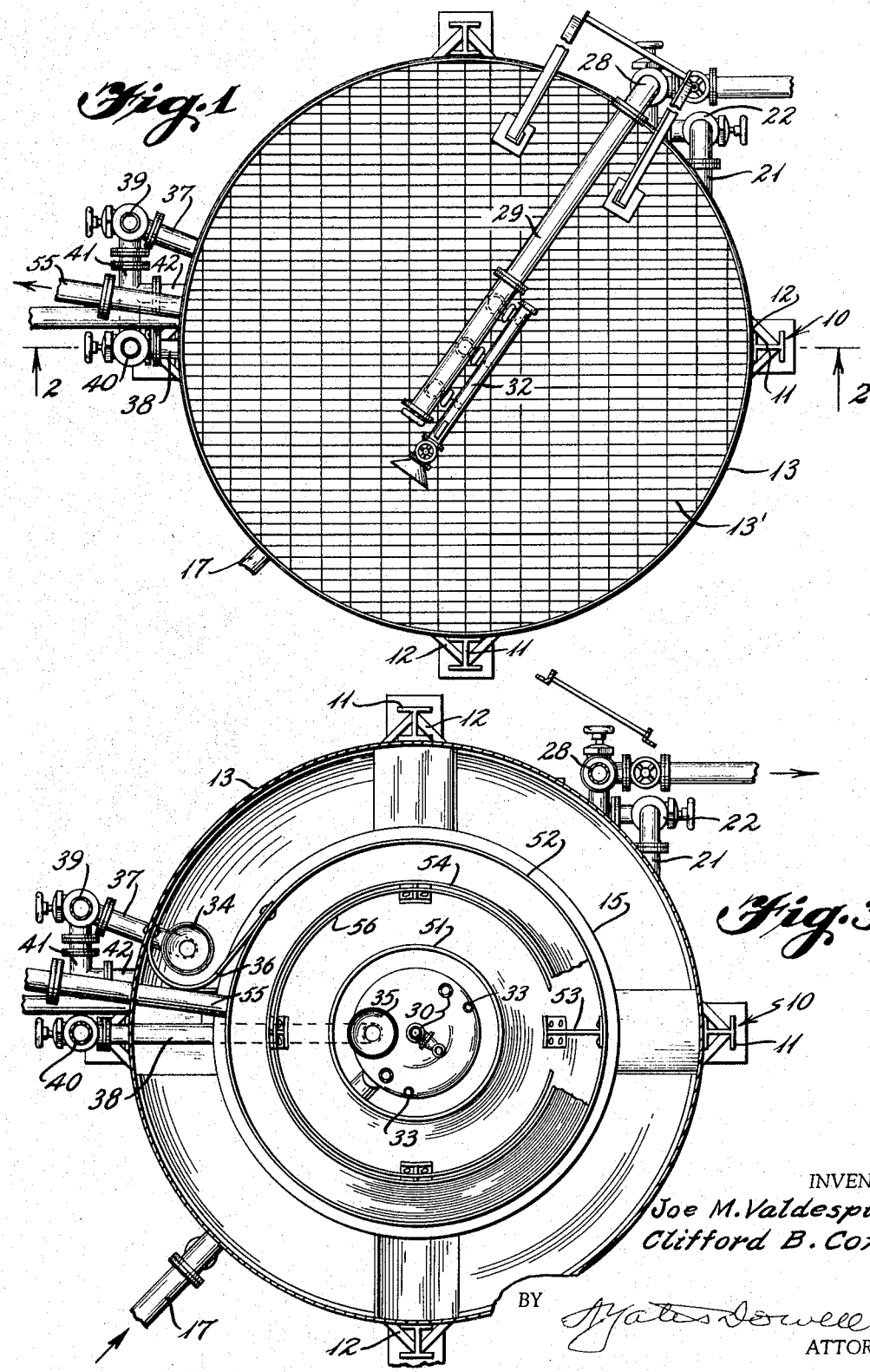

Jan. 17, 1967 J. M. VALDESPINO ET AL 3,298,526
WASTE TREATMENT PACKAGE PLANT
Filed Jan. 26, 1965 5 Sheets-Sheet 2

INVENTORS
Joe M. Valdespino and
Clifford B. Cox
BY
ATTORNEYS

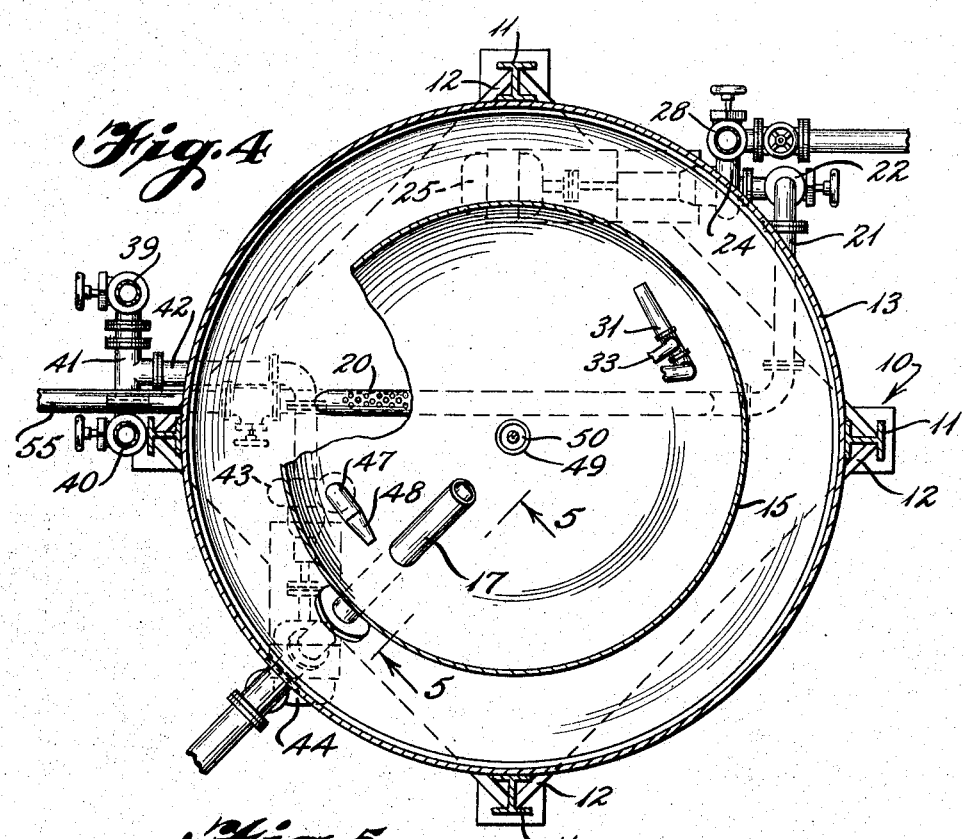
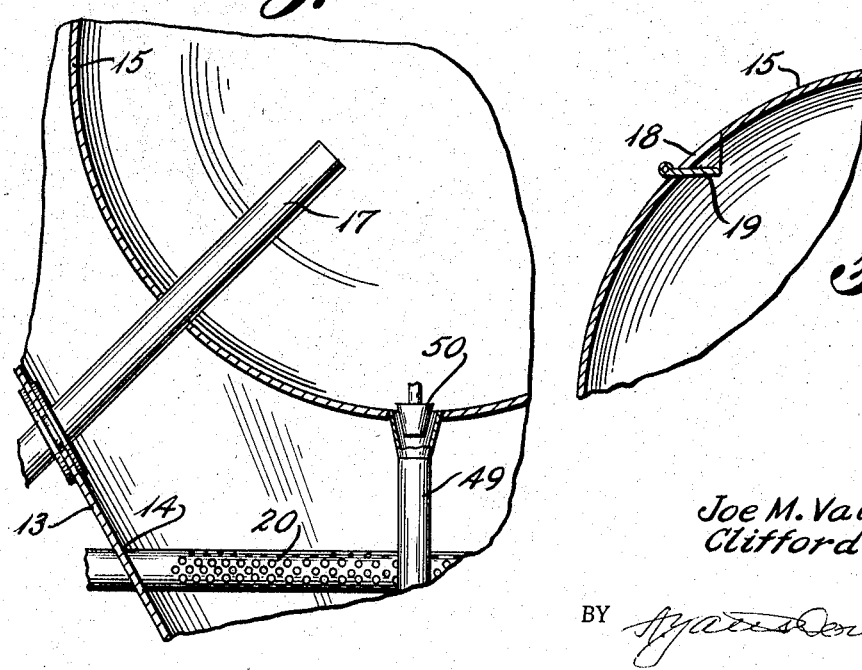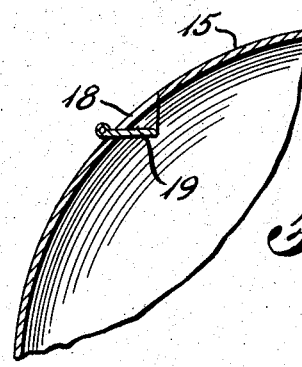

A--A NORMAL    - 40 to 55 MIN. EACH HOUR
A--C WASTE     - 30 SEC. to 2 MIN. AFTER INTERRUPTION OF 3 MIN. to 18 MIN.
B--B BACK-FLUSH - 30 SEC. to 1 MIN. AFTER WASTING

A₁ OR A₂ --A  NORMAL      - 10 to 59 MIN. EACH HOUR
B --B         GRIT-WASTE   - 30 SEC. to 1 MIN.
A₁ OR A₂ --B  SCUM-WASTE   - 30 SEC to 1 MIN.
              INTERRUPTION - 15 to 45 MIN.

INVENTORS
Joe M. Valdespino and
Clifford B. Cox

BY

ATTORNEYS

United States Patent Office 3,298,526
Patented Jan. 17, 1967

3,298,526
WASTE TREATMENT PACKAGE PLANT
Joe M. Valdespino, Orlando, Fla., and Clifford B. Cox, Chicago, Ill., assignors to Pacific Flush Tank Company, Chicago, Ill.
Filed Jan. 26, 1965, Ser. No. 428,067
12 Claims. (Cl. 210—195)

This invention relates to the treatment of waste matter of human or industrial origin and to apparatus and equipment for treating such waster matter with a minimum of time, effort and expense to prevent water pollution.

The invention relates particularly to a waste treatment system which can be manufactured and assembled at a factory or other site and thereafter transported and installed in a desired location and which will receive waste matter, purify the same and discharge substantially clear liquid.

Heretofore some factory assembled sewage treatment plants, commonly designated as "package plants," have been installed in connection with subdivisions, shopping centers, trailer courts, motels, and various institutions such as schools, hospitals, prisons, sanataria and the like, remotely situated from sewage collection systems. These "package plants" normally have been settling tanks, aeration tanks or sludge holding tanks. The settling tanks have had a detention time of four to twelve hours duration at average flow, the aeration tanks have had a detention time of six to twenty-four hours at average flow, and the sludge holding tanks, some of which have been aerated, have had a detention time of thirty to 150 days. The means of aeration has customarily been compressed air applied through jets or diffusing media into a body of liquid at some depth below the surface. Another means of aeration has been by rotating fans or blades generally at the surface of the liquid which generate a surface wave action to scatter bubbles of air through the liquid which will result in some absorption of oxygen into the body of liquid. Absorption and utilization of oxygen thus applied has generally been less than 10%. These prior devices have not been satisfactory since they have required too much space and have consumed too much time, as well as the fact that the effluent has not been of sufficient purification to meet local requirements.

It is an object of the invention to overcome the difficulties enumerated and to provide a waste treatment package plant for the treatment of sewage or other waste matter automatically in a minimum of time and with minimum effort so that occasional attendance by supervisory personnel is all that is required and one person may attend a number of scattered installations.

Another object of the invention is to provide a self-contained package plant including a central reactor compartment into which sewage or other waste matter is applied and a peripheral classifier compartment from which treated effluent will flow.

Still another object of the invention is to provide a self-contained waste treatment package plant having a pair of generally concentric compartments in which the action generated by the addition of air through venturi type aspirators in the central compartment will be relatively violent with rapidly circulating currents in the vertical and horizontal planes and in which a consistently strong velocity in the horizontal plane created by the application and position of such venturi type aspirators will be maintained and will predominate.

A still further object of the invention is to provide a package plant for the treatment of waste matter including a central reactor compartment and a concentric peripheral classifier compartment communicated by fixed or variable slots which will cause a directional flow out of the central compartment into the classifier compartment and will result in a steady uniform substantially reduced velocity in a horizontal plane.

A still further object of the invention is to provide means for returning particulate matter which has been discharged into the outer classifier compartment back into the central reactor compartment, and means for discharging relatively clear effluent from the outer clarifier compartment.

Figure 2:
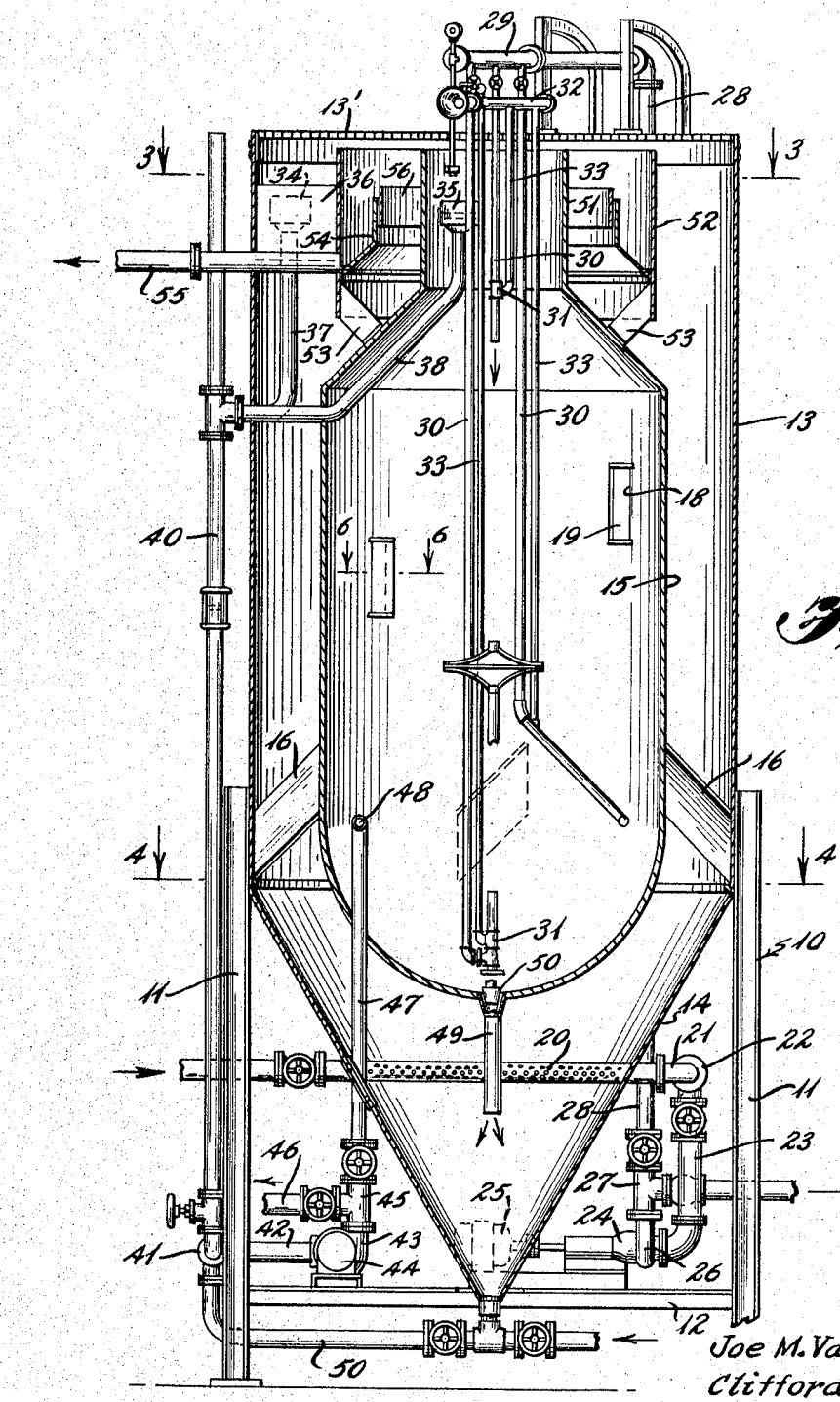
Figure 7:
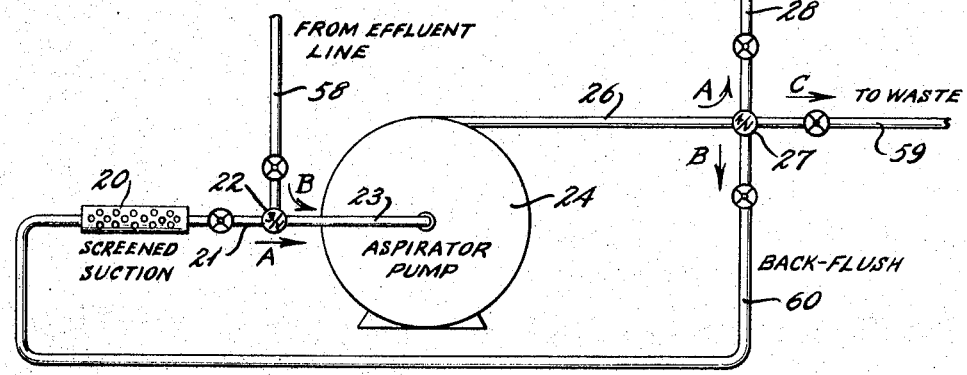
Figure 8:
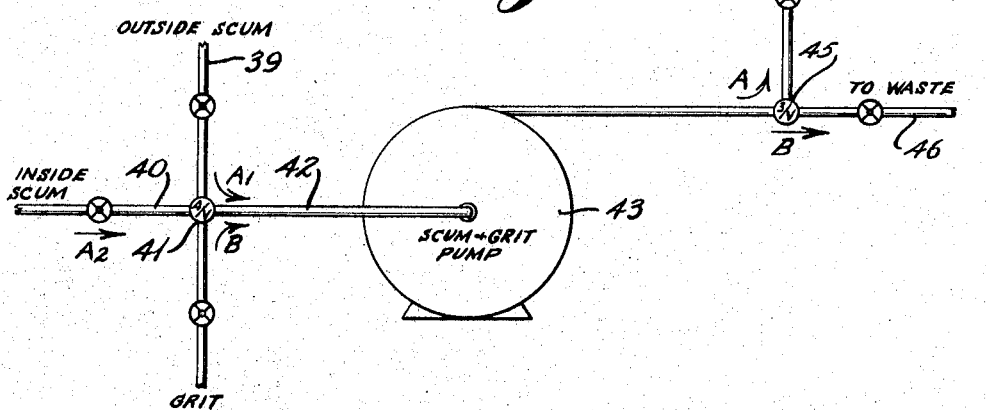

Other objects and advantages of the invention will be apparent from the following description taken in conjunction with the accompanying drawings in which:

FIG. 1 is a top plan view of the present invention;
FIG. 2, a vertical section on a slightly reduced scale and taken on the line 2—2 of FIG. 1;
FIG. 3, an enlarged section on the line 3—3 of FIG. 2;
FIG. 4, an enlarged section on the line 4—4 of FIG. 2;
FIG. 5, an enlarged fragmentary section on the line 5—5 of FIG. 4;
FIG. 6, an enlarged fragmentary detail section on the line 6—6 of FIG. 2;
FIGS. 7 and 8, schematic diagrams of the piping system of the present invention; and
FIG. 9, a vertical section of a modified form of the invention.

Briefly stated the present invention is a package plant for treatment of waste matter which includes a central reactor compartment and a concentric peripheral classifier compartment communicating therewith through a series of slots having fixed or variable deflectors which permit material from the reactor compartment to be discharged into the classifier compartment. Raw sewage or other waste matter is introduced into the reactor compartment through an influent line and partially processed waste matter is directed into the reactor compartment through venturi type aspirators while relatively clear fluid will be discharged from the classifier compartment through an effluent line. Air is introduced into the reactor compartment through the venturi type aspirators to cause relatively violent action with rapidly circulating currents in both vertical and horizontal directions, and material discharged through the slots into the classifier compartment will cause relatively steady uniform currents therein. Particulate material will be separated from the relatively clear liquid in the classifier compartment and the particulate material will be returned to the reactor compartment while the clear liquid is discharged from a clarifier area above the reactor compartment.

With continued reference to FIGS. 1–8 of the drawings a base or supporting frame 10 is provided having a plurality of uprights 11 connected by braces 12. The frame 10 may be disposed above ground level and rest on conventional footings or the like or such base may be partially imbedded in the ground. An outer generally cylindrical vertically disposed tank 13 is mounted on the frame 10 and such tank has an open top or upper end covered by a grill or platform 13' and has a substantially conical portion 14 at its lower end. An inner tank 15 is concentrically mounted within the tank 13 and is maintained in position by a plurality of stilling vanes or deflectors 16 which preferably are disposed at an angle for a purpose which will be described later. The inner tank 15 forms a reactor compartment and the space between the inner and outer tanks forms a classifier compartment. Raw sewage or other waste matter is introduced into the inner tank 15 through an upwardly inclined influent pipe 17 which discharges material substantially into the center of the inner tank 15.

In order to provide communication between the inner reactor compartment and the outer classifier compartment the inner tank 15 is provided with spaced slots or openings 18 located at different elevations around the periphery thereof and in each of which a vane or deflector 19 may be fixed or adjustably mounted so that liquid and some particulate material from the inner tank can be discharged into the outer classifier tank 13. A perforated suction pipe 20 is located in the conical portion 14 below the inner tank 15 with the perforations in such pipe being of a predetermined size to accommodate particulate matter having a specific gravity greater than the liquid and which will tend to sink to the bottom of such conical portion. The heavier gritty matter will sink directly to the bottom of the cone while the lighter particulate matter will be drawn to the suction pipe 20. Such suction pipe 20 is connected by a line 21 to a three-way valve 22 which in turn is connected by a line 23 to a pump 24 driven by a motor 25. Liquid and particulate material removed from the tank through the suction pipe 20 are discharged from the pump 24 through a discharge line 26 to a four-way valve 27 and then through an upstanding line 28 to a header 29 located above the tanks. A plurality of discharge lines 30 are connected to the header 29 and extend downwardly into the inner tank 15. The discharge lines 30 terminate at various levels within the reactor compartment and each of such lines has a venturi type aspirator 31 attached to the free end thereof. In order to retrain air within the material being discharged, an air header 32, which is open to the atmosphere at at least one end, is provided with a plurality of depending air lines 33 connected to the divergent section of the venturi type aspirators 31. If desired, the air lines 33 may be connected to a source of oxygen, carbon dioxide or ozone instead of, or in addition to, the air header 32. Movement of the liquid and particulate matter through the aspirators 31 creates a vacuum which draws air through the air lines 33 and entrains such air in the liquid stream. Each of the aspirators 31 has a constricted throat of a diameter greater than the perforations in the suction pipe 20 so that they will not become clogged.

One of the discharge lines 30 extends substantially to the bottom of the inner tank 15 and discharges material upwardly, a second discharge line is located near the top of the tank and discharges material downwardly, and a third discharge line is directed tangentially to the inner periphery of tank 15 and in a generally horizontal plane so that the action generated in the reactor compartment will be relatively violent with rapidly circulating currents in the vertical plane, the horizontal plane, and in all other angles. However, a consistently strong velocity in the horizontal plane will be maintained and will predominate.

Particulate matter which is of a lighter specific gravity than the liquid, and which has passed through the slots 18 into the classifier compartment, will float to the surface of such compartment and some of the material which remains in the reactor compartment will float to the surface of such compartment. In order to return the floating particulate material to the central portion of the reactor compartment and to cause disintegration thereof, a submerged intermittently operated suction weir or drain 34 is located in the upper portion of the classifier compartment and a second submerged intermittently operated suction weir or drain 35 is located in the upper portion of the reactor compartment. If desired, a skimmer or interception baffle 36 may be located in the upper portion of the classifier compartment to trap the particulate matter in the area of the suction weir 34. The weirs 34 and 35 are connected by lines 37 and 38 to standpipes 39 and 40, respectively, each of which has a vent at its upper end. The standpipes 39 and 40 are connected to a four-way valve 41 which in turn is connected by a line 42 to a pump 43 driven by a motor 44 for selectively discharging the particulate material and liquid from the standpipes. The pump 43 discharges material into a three-way valve 45 which may be selectively operated to direct the material through a line 46 to waste or such valve 45 may direct the material through a line 47 which extends into the reactor compartment and terminates in a torque nozzle 48. The torque nozzle 48 may direct the stream against a target such as a plate (not shown) which may be textured or may have perforations or protrusions to further disintegrate particulate material.

Particulate matter of a heavy gritty nature will settle to the bottom of the inner tank 15 and to the bottom of the conical portion 14 of the outer tank 13. Such gritty material is adapted to be periodically removed from the tanks and this is accomplished by providing a grit removal pipe 49 connected to the lowermost portion of the inner tank 15 and normally closed by a plug 50. The grit removal pipe 49 extends downwardly past the suction pipe 20 so that when the plug 50 is removed the grit from the inner tank will be discharged into the conical portion 14 of the outer tank. In order to remove the grit from the conical portion, the apex of such conical portion is connected to a line 50 having one end connected to the four-way valve 41 and the opposite end connected to an outside source of liquid. Periodically the valves 41 and 45 are operated to cause liquid to pass through the line 50 and the line 46 to remove the grit from the outer tank 13 and discharge such grit to waste.

In order to remove relatively clear fluid from the apparatus, the inner tank 15 has a reduced neck 51 which supports a ring baffle 52 of a diameter less than the diameter of the inner tank 15 by means of stilling vanes 53. The liquid which is rising in the classifier compartment will have a relatively slow peripheral velocity and will contain some floating particulate matter. As the rising liquid passes the opening between the inner tank 15 and the ring baffle 52, relatively clear liquid will enter into a clarifier zone located between the reduced neck 51 and the baffle 52 while the particulate matter will continue to rise in the classifier area exteriorly of the baffle 52. The stilling vanes 53 serve to diminish the peripheral velocity of the relatively clear liquid at the time of entrance to the clarifier zone. A baffle 54 is mounted on the interior of the ring baffle 52 and defines an effluent compartment in communication with an effluent line 55 through which relatively clear fluid is discharged. An adjustable overflow weir 56 is mounted on the upper portion of the baffle 54 to control the discharge of relatively clear fluid from the clarifier zone to the effluent compartment. The liquid which is discharged through the effluent line 55 may be discharged into subsequent treating elements such as trickling filters, settling ponds, or the like, or such effluent may be discharged into an available stream or river.

With reference to FIG. 7 the pump 24 may be utilized to back flush the suction pipe 22 when desired. This is accomplished by connecting a line 58 to the three-way valve 22 from a source of relatively clear liquid such as the effluent line 55. A waste line 59 and a back flush line 60 are connected to the four-way valve 27 and the opposite end of the line 60 is connected to the suction pipe 20. During normal operation the valve 22 is arranged so that the pump 23 draws fluid and particulate matter from the conical portion 14 through the suction pipe 20 and discharges such fluid and matter through the line 28. Periodically the suction pipe 20 will become partially clogged and in order to clear the same, the operation of the pump 24 is interrupted for a predetermined length of time after which the valve 27 is operated to align the waste line 59 with the discharge line 26 and the pump 24 is restarted to discharge liquid and particulate matter to waste for a short interval.

Thereafter the valve 22 is operated to connect the clear liquid line 58 with the line 23 to introduce clear liquid into the pump 24 and the valve 27 is operated to connect the line 26 with the back flush line 60. Since the relatively clear fluid cannot pass through the valve 22, such fluid is pumped outwardly through the perforations in the suction pipe 20 for a short interval to remove any material which might be clogging the perforations.

Thereafter the valves 22 and 27 are again operated to continue the normal flow through the pump 24.

If desired, all of the operations outlined may be automatically programmed to suit particular conditions using conventional time clocks and electric valves, so that occasional attendance by supervisory personnel is all that is required.

In the operation of the device fluid is initially introduced into the reactor compartment and the classifier compartment, after which the pump 24 is operated and raw or partially digested waste material is introduced into the reactor compartment through the influent pipe 17. Air and liquid are discharged into the reactor tank through the venturi type aspirators 31 to create a relatively violent action in the reactor compartment with rapidly circulating currents in both horizontal and vertical directions and with the currents in the horizontal plane predominating. The liquid and particulate material within the reactor compartment will rotate rapidly and some of such liquid and material will be discharged from the reactor compartment through the slots 18 into the classifier compartment where it will be rotated at a slower more constant speed. In the classified compartment the particulate material which is heavier than water will settle to the bottom assisted by the angularly disposed stilling vanes 16. The relatively heavy particulate material of a gritty nature will sink directly to the bottom while the lighter particulate material will be drawn into the suction pipe 20 by means of the pump 24 and will be forced upwardly through the line 28 into the header 29 and then into the discharge lines 30 and subsequently back into the reactor compartment to further disintegrate the particulate material.

Simultaneously the particulate matter which is lighter than the liquid will rise to the top of both the reactor compartment and the classifier compartment and such material will be periodically selectively removed through the suction weirs 34 and 35 by means of the pump 43 and discharged back into the reactor compartment through the line 47 and the torque nozzle 48. Relatively clear liquid will enter the clarifier area defined by the ring baffle 52 and will be discharged over the overflow weir 56 and will be discharged through the effluent line 55.

Figure 9:
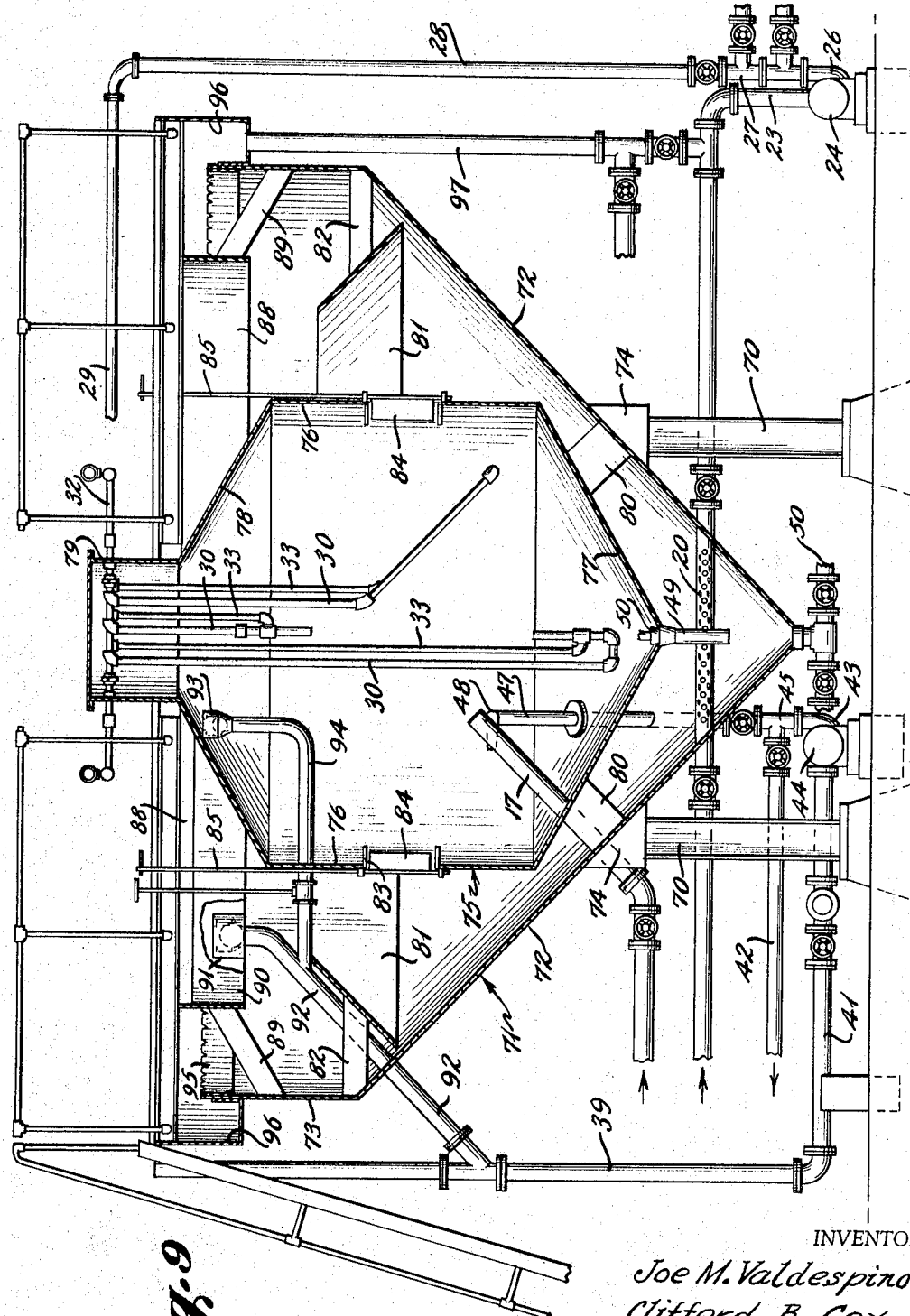

With reference to FIG. 9, a modified form of the invention is disclosed which operates in the same manner and in which like parts have like reference numbers. In this modification a plurality of upright supports 70 are mounted on conventional footings and preferably disposed above the ground level. An outer tank 71 is provided having a conical portion 72 throughout most of its length and a relatively short cylindrical portion 73 at the upper end. The conical portion 72 has a plurality of bosses or enlargements 74 engageable with the uprights 70 for supporting the outer tank 71. An inner tank 75 having a generally cylindrical central portion 76 terminating in a conical bottom 77 and a frusto-conical top 78 with an upwardly extending neck portion 79 disposed centrally thereof extending above the outer tank 71. The inner tank 75 and the outer tank 71 are coaxially and concentrically disposed and the inner tank is supported on the outer tank by means of stilling vanes or braces 80. The angle of the conical portion 72 of the outer tank 71 is relatively steep with regard to a horizontal plane while the angle of the conical bottom 77 of the inner tank 75 is relatively shallow with regard to a horizontal plane to cause a restricted area at the lowermost edge of the central portion 76 and a gradual widening thereafter.

An angular baffle 81 is fixed within the outer tank 71 by braces 82 and such baffle is disposed at an angle counter to or opposite the angle of the conical portion 72 of such outer tank 71. The lower extremity of the baffle 81 extends downwardly and outwardly to a position closely adjacent to the conical portion 72 and the upper extremity terminates in spaced relation to the inner tank 75 to form a restricted area therebetween. Such inner tank has a plurality of slots or openings 83 located generally centrally of the cylindrical portion 76 and each of such slots is provided with an adjustable vane or deflector 84. The position of the vanes 84 is controlled by an operating rod 85 extending upwardly above the water level of the outer tank 71 and such rod is operated to regulate the amount of material discharged from the reactor compartment of inner tank 75 into the classifier compartment of outer tank 71. The centers of the slots 83 are substantially in alignment with the lower extremity of baffle 81 so that as material leaves the central reactor compartment in a horizontal direction, the upper portion of the stream will impinge upon the baffle 81 and be deflected downwardly while the lower portion of the stream will impinge upon the conical portion 72 of the outer tank and will be deflected upwardly. The downwardly deflected portion and the upwardly deflected portion will form a zone of neutrality in which the particulate material will flow around the central portion of the inner tank 75.

Floating particulate material having a specific gravity less than the liquid will flow toward the top of the outer tank 71 and will pass through the restricted area between the upper extremity of the baffle 81 and the inner tank 75 which will increase the velocity and thereby accelerate the upward movement of floatable material. Likewise particulate material having a specific gravity greater than the fluid will pass through a restricted area between the conical portion 72 of the outer tank and the conical bottom 77 of the inner tank which will increase the velocity of the settable material and thereby accelerate the settling thereof.

A perforated suction pipe 20 is disposed in the bottom portion of the outer tank 71 in a manner similar to the previous modification to return portions of the particulate material to the reactor tank while the heavier gritty matter will sink directly to the bottom of the cone where it will be periodically removed.

A ring baffle 88 is disposed within the outer tank 71 and is mounted therein by braces 89 in spaced relation to the cylindrical portion 73 of the outer tank. Floating particulate matter will rise to the surface within the ring baffle 88 and will be slowly rotated by currents created by the liquid as it is discharged through the slots 83. In order to return the floatable particulate matter to the inner tank for further processing, an interception baffle 90 is disposed between the ring baffle 88 and the frusto-conical top 78 to trap the particulate matter. An adjustable overflow drain 91 is located adjacent to the interception baffle and such drain is connected by a line 92 to a stand pipe 39 as previously described. A second adjustable overflow drain 93 may be mounted within the upper portion of the inner tank and connected by a line 94 to the line 92 for returning particulate matter from the upper portion of the reactor compartment to the central portion thereof to cause disintegration of such matter.

An overflow weir 95 is adjustably mounted on the upper extremity of the cylindrical portion 73 of the outer tank 71 to control the level of the fluid being discharged from such outer tank. Fluid which overflows the weir 95 will be received within a clarifier compartment or channel 96 located around the entire outer periphery of the cylindrical portion 73 and such channel is provided with an effluent line 97 through which relatively clear fluid is discharged.

In the operation of this modification, raw or partially digested waste material which is suspended in a liquid is introduced into the reactor compartment through the influent line 17 where it is subjected to a relatively violent action created by the injection of air and liquid through the venturi type aspirators. Due to the circulating currents being predominantly in a horizontal plane as well as the vanes 84, some of the liquid and particulate material will be discharged from the reactor compartment through the slots 83 and will be rotated at a slower more constant speed in the classifier compartment. The upper portion of the stream will impinge upon the baffle 81 and will be deflected downwardly while the lower portion of the stream will impinge upon the conical bottom 72 and be deflected upwardly and will form a neutral zone for the particulate material.

Particulate material which is heavier than the liquid will sink and pass through the restricted area between the inner and outer tanks which will tend to accelerate the settling of such material and particulate material which is lighter than the liquid will float upwardly through the restricted area between the upper extremity of the baffle 81 and the inner tank to accelerate the floating material in an upward direction. Material which is of substantially the same weight as the liquid will remain in the neutral zone and will be circulated through the classifier compartment until it either rises to the top or sinks to the bottom thereof.

The heavier particulate material will be subjected to the suction pipe 20 where the lighter material will be subsequently discharged back into the reactor tank as previously described and the heavier gritty material will sink to the bottom and will subsequently be intermittently discharged. The floating particulate material will be discharged through the adjustable overflow drain 91 and through the stand pipe 39 either to waste through the line 42 or back into the reactor compartment through the nozzle 48. Relatively clear liquid which rises to the surface will pass under the ring baffle 88 and then over the overflow weir 95 into the channel 96 where it will be discharged through the effluent line 97. The floating particulate material cannot pass the ring baffle 88 but will be collected in the area of the overflow drain by the interception baffle 90.

On occasions an excess quantity of particulate matter will accumulate and prevent the proper functioning of the apparatus in that the effluent liquid will contain too much particulate matter. On these occasions, the circulation may be interrupted for a period to permit concentration to a desired degree after which a volume of particulate matter may be withdrawn and wasted or directed to a holding tank so as to be available for return to the process during slack periods.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A waste treatment package plant comprising a support frame, an outer generally cylindrical tank having a conical bottom portion mounted on said frame, an inner generally cylindrical tank having a reduced neck at one end located concentrically within said outer tank, means for introducing waste material into said inner tank, said inner tank having a plurality of slots providing communication between said inner and outer tanks, a perforated suction pipe located in the conical portion of said outer tank, a first pump means connected to said suction pipe for removing liquid and particulate waste material from said outer tank, a first discharge line connected to said first pump means and extending into said inner tank, a venturi type aspirator mounted on said first discharge line, an air line connected to said aspirator for entraining air in said liquid and particulate material, a suction weir mounted in the upper portion of said outer tank, a second pump means connected to said suction weir for removing floating particulate material from the upper portion of said outer tank, a second discharge line connected to said second pump means and extending into said inner tank, a torque nozzle mounted on said second discharge line, a ring baffle of a diameter less than the diameter of said inner tank mounted on said reduced neck, and an effluent line extending through said outer tank and said baffle for discharging relatively clear liquid from within said baffle.

2. A waste treatment package plant comprising an outer generally cylindrical vertically disposed tank, an inner generally cylindrical tank having a reduced neck at one end located concentrically within said outer tank, means for introducing liquid and waste material into said inner tank, said inner tank having plurality of openings providing communication between said inner and outer tanks, a perforated suction pipe disposed in one end of said outer tank, means for removing liquid and particulate waste material from said outer tank through said perforated suction pipe and discharging such liquid and waste material into said inner tank, means for introducing air into said inner tank, a selectively operated suction weir mounted in the opposite end of said outer tank for removing floating particulate material and liquid therefrom, means for discharging the liquid and floating particulate material into said inner tank, a ring baffle fixed to said reduced neck and spaced therefrom, and an effluent line attached to said ring baffle for discharging material from said tanks whereby said waste material will be caused to disintegrate and relatively clear liquid will be discharged through said effluent line.

3. The structure of claim 2 in which the means for introducing air includes a venturi type aspirator.

4. The structure of claim 2 in which the means for removing liquid and particulate waste material through said perforated suction pipe includes a discharge header, a plurality of discharge lines extending from said header into said inner tank, said discharge lines terminating at various elevations within said inner tank.

5. The structure of claim 4 including a venturi type aspirator on each of said discharge lines.

6. The structure of claim 2 including a selectively operated suction weir mounted in the upper end of said inner tank and for returning particulate matter and liquid to the central portion of such tank.

7. The structure of claim 2 including a grit removal pipe mounted on said inner tank and adapted to selectively remove grit therefrom.

8. The structure of claim 2 including means for removing grit from said outer tank.

9. A waste treatment package plant comprising an outer generally cylindrical tank having a conical bottom portion, an inner generally cylindrical tank mounted concentrically within said outer tank, said inner tank having a reduced neck at one end, a ring baffle of a diameter less than said inner tank mounted on said reduced neck, said inner tank defining a reactor compartment, the space between said inner and outer tanks defining a classifier compartment, the space between said reduced neck and said ring baffle defining a clarifier compartment, means for creating a violent action in said reactor compartment, means for discharging portions of the material in said reactor compartment into said classifier compartment, means in said classifier compartment for returning particulate material to said reactor compartment, means for discharging relatively clear liquid from said classifier compartment into said clarifier compartment, and means for discharging the relatively clear liquid from said clarifier compartment to the exterior of the tanks.

10. A waste treatment package plant comprising a first tank having walls defining a conical portion located on a generally vertically disposed axis, a second tank having a cylindrical wall portion and a generally vertically disposed axis located concentrically within said first tank, an inlet extending through said first tank for introducing liquid and waste material into said second tank, said second tank having a plurality of openings in said cylindrical wall portion, a deflector mounted in each of said openings for directing material from said second tank into said first tank, a perforated suction pipe located in said conical portion of said first tank below said second tank, means for removing liquid and particulate matter from the lower portion of said first tank through said suction pipe and discharging such liquid and particulate matter into said second tank, means for introducing air into said second tank to create a violent action, an overflow drain located in the upper portion of said first tank, intermittently operated pump means connected to said drain for removing floating particulate matter from said first tank and discharging it into said second tank, a ring baffle in the upper portion of said first tank spaced from said second tank, an overflow weir in the upper portion of said first tank and in spaced relation to said ring baffle and defining an effluent compartment, and an effluent line for discharging relatively clear liquid from said effluent compartment.

11. The structure of claim 10 including an angular baffle located in said first tank and having its lower extremity located closely adjacent to the conical portion thereof and its upper extremity spaced from said second tank, the lower extremity of said angular baffle being in alignment with the openings in said second tank, whereby the upper portion of the liquid and particulate matter discharged through said openings will impinge upon said angular baffle and be directed downwardly while the lower portion of the liquid and particulate matter discharged through said openings will impinge upon the conical portion of the first tank and be directed upwardly.

12. The structure of claim 11 including a first restricted area between the upper extremity of said angular baffle and said second tank and a second restricted area between the conical portion of said first tank and said second tank to accelerate movement of said liquid and particulate matter.

No references cited.

SAMIH N. ZAHARNA, *Primary Examiner.*

J. DECESARE, *Assistant Examiner.*